(12) United States Patent
Calhoun

(10) Patent No.: US 10,964,955 B2
(45) Date of Patent: Mar. 30, 2021

(54) METHODS AND SYSTEMS FOR PROVIDING BACKUP POWER

(71) Applicant: Rensselaer Polytechnic Institute, Troy, NY (US)

(72) Inventor: Patrick Calhoun, Cohoes, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 83 days.

(21) Appl. No.: 16/096,461

(22) PCT Filed: Apr. 25, 2017

(86) PCT No.: PCT/US2017/029256
§ 371 (c)(1),
(2) Date: Oct. 25, 2018

(87) PCT Pub. No.: WO2017/189487
PCT Pub. Date: Nov. 2, 2017

(65) Prior Publication Data
US 2019/0123360 A1 Apr. 25, 2019

Related U.S. Application Data

(60) Provisional application No. 62/327,330, filed on Apr. 25, 2016, provisional application No. 62/489,012, filed on Apr. 24, 2017.

(51) Int. Cl.
*H01M 6/32* (2006.01)
*H01M 2/10* (2006.01)
(Continued)

(52) U.S. Cl.
CPC .......... *H01M 6/32* (2013.01); *H01M 2/1077* (2013.01); *H01M 6/045* (2013.01); *H01M 6/42* (2013.01);
(Continued)

(58) Field of Classification Search
CPC ............ H01M 6/32; H01M 6/34; H01M 6/30; H01M 6/44; H01M 6/5077; H01M 6/045; H01M 2/1077
(Continued)

(56) References Cited

U.S. PATENT DOCUMENTS

| 857,880 A | 6/1907 | Hite |
| 2,474,716 A | 6/1949 | Beechlyn |

(Continued)

FOREIGN PATENT DOCUMENTS

| CN | 101859854 A | 10/2010 |
| CN | 101859884 A | 10/2010 |

(Continued)

OTHER PUBLICATIONS

International Search Report and The Written Opinion of the International Searching Authority, International Application No. PCT/US2017/029236, dated Jul. 10, 2017.

*Primary Examiner* — Gregg Cantelmo
(74) *Attorney, Agent, or Firm* — Murtha Cullina LLP; Anthony P. Gangemi

(57) ABSTRACT

Methods and systems for providing battery backup power to a home or other building are disclosed. Methods and systems include a fluid container holding an electrolyte solution. The electrolyte solution is prevented from flowing through an array of galvanic cells having annular flow paths via a fluid flow control mechanism, such as a valve, which is energized by an external power source. When the external power source is removed, such as during a power outage, the fluid flow control mechanism is deenergized and electrolyte solution is allowed to flow through the galvanic cell array, generating electric current. Energy produced by the system then powers the home or other building until the external power source returns, which in turn closes the fluid flow (Continued)

control mechanism and ceases energy production by the system.

18 Claims, 4 Drawing Sheets

(51) Int. Cl.
  *H01M 6/04* (2006.01)
  *H01M 6/42* (2006.01)
(52) U.S. Cl.
  CPC .............................. *H01M 2220/10* (2013.01); *H01M 2300/0002* (2013.01)
(58) Field of Classification Search
  USPC .................... 429/51, 52, 72, 73, 74, 80, 118
  See application file for complete search history.

(56) References Cited

U.S. PATENT DOCUMENTS

| | | | |
|---|---|---|---|
| 2,964,583 A | 12/1960 | Fafa et al. | |
| 3,100,164 A | 8/1963 | Solomon et al. | |
| 3,343,988 A | 9/1967 | Friend, Jr. | |
| 3,423,245 A | 1/1969 | Waller | |
| 4,039,728 A | 8/1977 | Cheron | |
| 4,049,878 A | 9/1977 | Lindstrom | |
| 4,341,847 A * | 7/1982 | Sammells | H01M 8/184 429/178 |
| 4,521,497 A * | 6/1985 | Tamminen | H01M 2/38 429/406 |
| 5,615,717 A * | 4/1997 | Cheiky | H01M 2/362 137/260 |
| 6,355,369 B1 | 3/2002 | Iarochenko et al. | |
| 6,558,829 B1 * | 5/2003 | Faris | H01M 10/42 320/101 |
| 2004/0247961 A1 | 12/2004 | Edlund | |
| 2007/0259230 A1 | 11/2007 | Berntsen et al. | |
| 2007/0279953 A1 | 12/2007 | Hoff et al. | |
| 2015/0111113 A1 | 4/2015 | Kameyama et al. | |
| 2017/0170451 A1 * | 6/2017 | Englert | H01M 2/40 |

FOREIGN PATENT DOCUMENTS

| | | | | |
|---|---|---|---|---|
| FR | 2060759 A5 | 6/1971 | | |
| GB | 971351 A | 9/1964 | | |
| WO | WO-2015165708 A2 * | 11/2015 | | H01M 2/30 |

* cited by examiner

METHODS AND SYSTEMS FOR PROVIDING BACKUP POWER

CROSS REFERENCE TO RELATED APPLICATION(S)

This application is a national stage filing of International Patent Application No. PCT/US2017/029256, filed Apr. 25, 2017, which claims the benefit of U.S. Provisional Application Nos. 62/327,330, filed Apr. 25, 2016, and 62/489,012, filed Apr. 24, 2017, which are incorporated by reference as if disclosed herein in their entirety.

BACKGROUND

As dependency on electronic devices increases, so does the age and unreliability of electrical distribution networks. In the United States, the average home is powered by the electric grid. The "Grid" is an intertwined web of transmission wires that supply various voltages to a multitude of buildings. While this network is generally reliable, there are instances where it fails.

As dependency on electronic devices is increasing, so is the age of the Grid. Power failures, or outages, are usually limited to small regions and have short durations, ranging from a minutes to hours, and sometimes days. On rare occasions, outages can be spread across large geographic areas, or can last multiple weeks. External effects, including age, also affect the reliability of power distribution, including weather patterns, attacks from nefarious organizations, and solar activity.

Currently, homeowners and corporations alike rely on generators to supply backup electrical power. There are three methodologies for providing this power: (1) Stationary generators; (2) portable generators; and, to a lesser extent, (3) backup batteries. Stationary generators are widely used for industrial or large building applications where the cost of installation and fuel are outweighed by the revenue or necessity of maintaining power. Portable generators are small in size and are generally designed to be used on worksites where electrical power is not readily available. These generators are usually gasoline powered although some diesel options are available. Portable generators are limited in capacity and can supply vital circuits in a home for as long as a fuel supply is present. These generators are not designed to be permanently installed in a circuit breaker and require a power cord to connect directly to components.

Both portable and stationary generators are restricted in placement in or near a home based on fresh air intakes to the building's ventilation supply. Further, these units necessitate the combustion of some fuel type and therefore produce exhaust gasses that are hazardous to health when inhaled. In addition, the cost of fuel and need to refill that supply has certain economic drawbacks. Both types of generators are limited by the volume of fuel in storage. Portable and stationary generators require a fuel source, which often has limited capacity, such as a fuel tank.

Battery backup systems are becoming popular alternatives to the above-mentioned generators, with the aim of avoiding the environmental impacts of fossil fuels and the inconvenience of having to consistently refill the system with fuel. These systems usually incorporate lithium-ion batteries that are designed to operate up to on a daily basis. However, there are real concerns about the environmental impact of lithium ion batteries, namely from the processes currently employed in mining the materials necessary for their operation and the methods of their construction. Further, they are often quite expensive.

SUMMARY

Some embodiments of the disclosed subject matter are directed methods and systems for providing backup power that include a deferred-action battery. The battery is considered "deferred-action" because it sits in a dormant state until energy supplied by it is desired.

In some embodiments, the battery includes a fluid container holding an electrolyte solution. When in a dormant state, an external power source energizes a fluid flow control mechanism, such as a valve, which prevents flow of the electrolyte solution to a galvanic cell. When the external power source is removed, such through a power outage, the fluid flow control mechanism deenergizes and electrolyte solution flows to the galvanic cell, initiating a reduction-oxidation reaction and producing electric current. The power source for the home or other building is then switched from the external power source to the system until the external power source returns.

In some embodiments, the galvanic cell includes a first electrode and a second electrode surrounding the first electrode, defining an annular space through which the electrolyte solution flows. In some embodiments, the electrolyte solution is recycled back to the fluid container after flowing through the galvanic cell to be recirculated through the system. When the external power source is reintroduced, the fluid flow control mechanism is reenergized, stopping further flow of electrolyte solution through the galvanic cell and returning the system to a dormant state.

Therefore, the system provides near continuous energy to a home or other building by switching to the system as an alternative power source upon loss of an external power source, such as the Grid.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
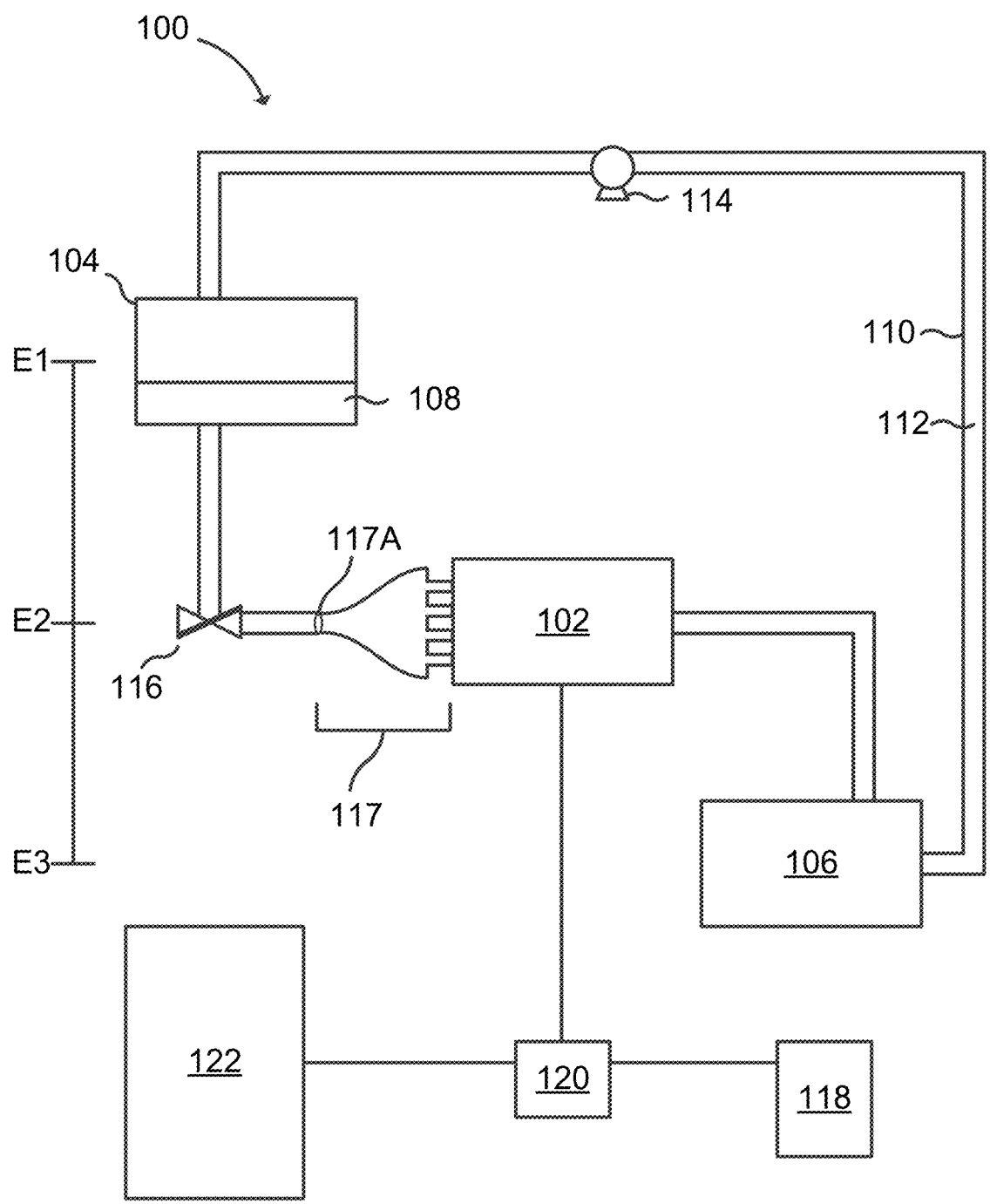
FIG. 1 is a schematic drawing of a backup power system according to some embodiments of the present disclosure.

Referring now to FIG. 1, aspects of the disclosed subject matter include a backup power system 100 for providing backup power to a target, e.g., residential or commercial buildings, etc. In some embodiments, backup power system 100 includes an energy source 102 such as a battery, and first and second fluid containers 104 and 106, respectively, for storing an electrolyte solution 108 that is cycled through the energy source to produce energy.

In some embodiments, first fluid container 104 includes electrolyte solution 108 in fluid communication with battery 102, which flows from the first fluid container through the battery to produce energy. In some embodiments, electrolyte solution 108 includes an aqueous salt. In some embodiments, the aqueous salt is any ionic material soluble in water and capable of sustaining a half reaction in a galvanic cell of battery 102. In some embodiments, electrolyte solution 108 includes sodium chloride, water, sodium bicarbonate (NaHCO$_3$), potassium hydroxide (KOH), lithium bromide (LiBr), zinc nitrate (ZnNO$_3$), and combinations thereof and the like.

First fluid container 104 contains electrolyte solution 108 until a predetermined quantity of energy is produced by system 100. In some embodiments, second fluid container 106 is in fluid communication with first fluid container 104 via a recycle conduit 110 that contains a recycle stream 112 of electrolyte solution 108. Recycle conduit 110 is typically a pipe but could also be an open channel or other conduit for directing recycle stream 112. Recycling of electrolyte solution 108 sustains activity of system 100, which may stagnate if the electrolyte solution remains static within battery 102. In some embodiments, additional fluid containers are included.

Still referring to FIG. 1, in some embodiments, flow of electrolyte solution 108 from first fluid container 104 to battery 102 is gravity fed, e.g., battery 102 is positioned at a lower elevation relative to first fluid container 104. Fluid communication between first fluid container 104 and battery 102 allows delivery of electrolyte solution 108 to battery 102 through gravity alone.

In some embodiments, flow from battery 102 to second fluid container 106 is gravity fed. Again, fluid communication between battery 102 and second fluid container 106 allows delivery of electrolyte solution 108 from battery 102 to second fluid container 106 for recycling through gravity alone, if necessary. Positioning first fluid container 104, battery 102, and second fluid container 106 at declining elevations, i.e., the first fluid container is positioned at an elevation E1 above the battery, which is at E2, and the second fluid container is positioned at an elevation E3 below both the first fluid container and the battery, also enables faster drying of the cells in the battery. In some embodiments, first fluid container 104, battery 102, and second fluid container 106 are positioned in a vertical stack. In some embodiments, system 100 includes a pump 114. Pump 114 is used to recycle electrolyte solution 108 back to first fluid container 104. In some embodiments, pump 114 is powered by battery 102.

Again, still referring to FIG. 1, in some embodiments, system 100 includes a reversible fluid flow control mechanism 116 such as a valve to control flow of electrolyte solution 108 from first fluid container 104 to battery 102. In some embodiments, valve 116 is a solenoid valve, hydraulic valve, pneumatic valve, motor valve, or a combination thereof.

In some embodiments, when valve 116 is energized, it is closed and prevents fluid flow from first fluid container 104. When valve 116 is deenergized, it opens and allows fluid flow from first fluid container 104. In some embodiments, valve 116 is energized by an external power source 118. In some embodiments, valve 116 is provided in a conduit that facilitates fluid communication between first fluid container 104 and battery 102. In some embodiments, valve 116 is positioned in first fluid container 104.

In some embodiments, an inlet such as inlet plenum 117 directs electrolyte solution 108 to battery 102. In some embodiments, inlet plenum 117 includes its own fluid container. In some embodiments, inlet plenum 117 includes its own conduit or series of conduits. In some embodiments, inlet plenum 117 includes its own inlet/outlet ports or plurality of inlet/outlet ports, such as refill port 117' of the inlet plenum. In some embodiments, inlet plenum 117 is positioned and configured to provide optimized flow of electrolyte solution 108 to flow path to battery 102. In some embodiments, valve 116 is positioned in or adjacent to inlet plenum 117. In some embodiments, inlet plenum 117 is positioned at elevation E2, or between E1 and E2. In some embodiments, inlet plenum 117 is a nozzle. In some embodiments, inlet plenum 117 is any combination of fluid containers and conduits that are positioned for sufficient flow of electrolyte solution 108 therethough.

In some embodiments, second fluid container 106 is in fluid communication with battery 102. In some embodiments, flow of electrolyte solution 108 through system 100 is generally from first fluid container 104, through flow path 204, to second fluid container 106, to recycle conduit 110, and back to first fluid container 104. In some embodiments (not pictured), flow of electrolyte solution 108 is generally from first fluid container 104, through battery 102, to recycle conduit 110, and back to first fluid container 104 (i.e., electrolyte solution 108 is recycled to first fluid container 104 without passing through additional fluid containers).

By positioning battery 102 at elevation E2, which is lower than first fluid container 104, when loss of external power source 118 results in the opening of valve 116, electrolyte solution 108 gravity feeds to battery 102 and battery 102 begins producing energy. As discussed above, this energy is at least in part used to power pump 114, which recycles electrolyte solution 108 to first fluid container 104 for additional flow cycles to generate additional energy until external power source 118 is reinstated, valve 116 is reenergized, further fluid flow from first fluid container 104 to battery 102 is prevented, and system 100 reverts to a dormant state.

Still referring to FIG. 1, in some embodiments, system 100 includes a transfer switch 120. Transfer switch 120 supplies power from system 100 to an electric panel 122, such as in use in a home or other building, when external power source 118 is removed from the electric panel and switches power supply back to the external power source when restored. When external power source 118 is removed, such as through a power outage or other event, valve 116 deenergizes, electrolyte solution 108 flows through battery 102, and energy generation begins. Power is fed to pump 114 and finally to electric panel 122 by transfer switch 120. Thus, without operator intervention, power can be supplied substantially continuously to a home or other building even during power outages such as Grid failures, etc. In some embodiments, backup power system 100 includes electrical components to facilitate distribution of energy stored in battery 102. In some embodiments, the battery system includes an inverter for converting DC current to AC current. In some embodiments, energy generated by battery 102 is supplied to end users, e.g., such as pump 114 and electric panel 122, as AC current.

Figure 2:
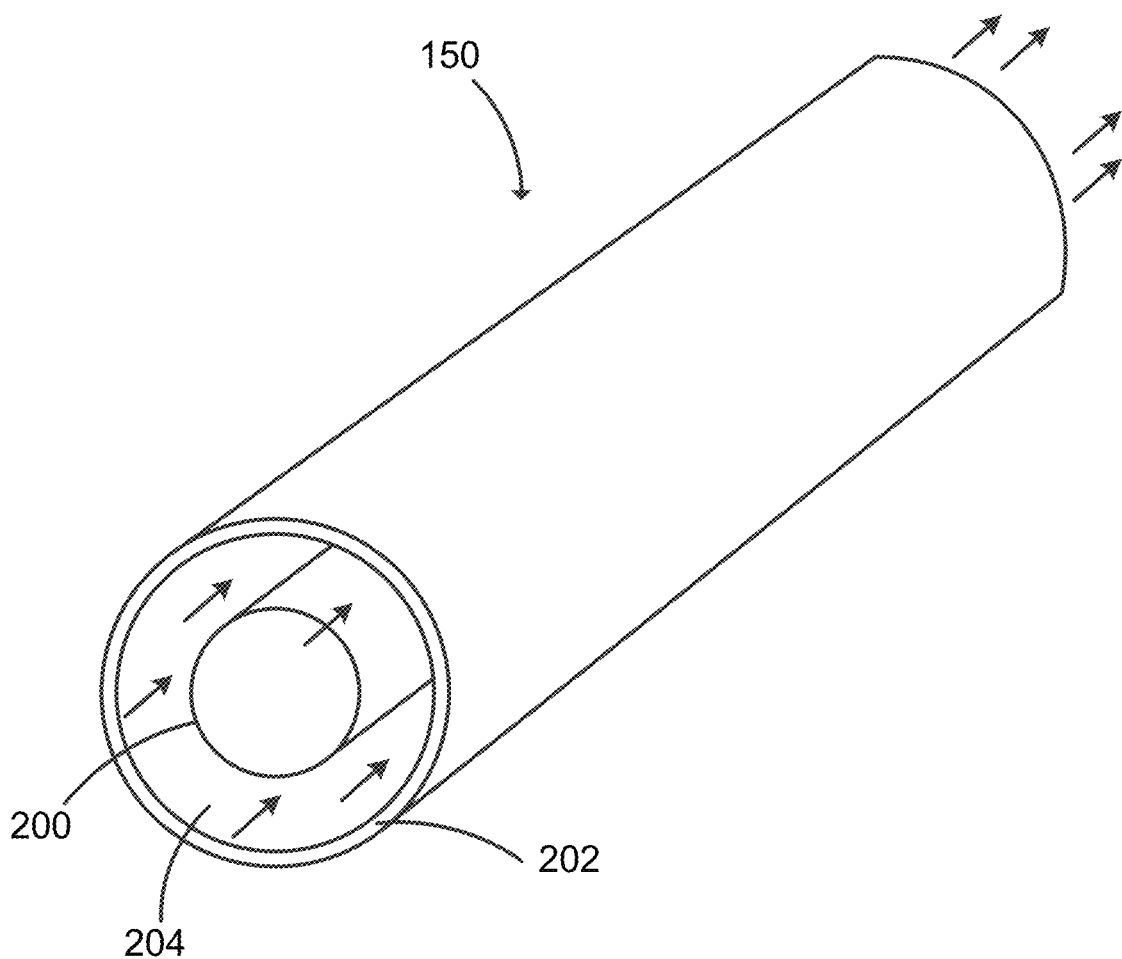
FIG. 2 is a schematic drawing of a galvanic cell according to some embodiments of the present disclosure.

Referring now to FIG. 2, in some embodiments, battery 102 includes a pair of electrodes 150, i.e., a first electrode 200, a second electrode 202, and a space 204 between the electrodes that defines a flow path (indicated by arrows) for electrolyte solution 108. In some embodiments, pair of electrodes 150 are fabricated from at least one of steel, aluminum, magnesium, zinc, gold, platinum, copper, carbon, graphite, graphene, carbon fiber, titanium, alloy 20 stainless steel, stainless steel 316 and 317 nickel copper, stainless steel grades 301, 304, 321 and 347, silver, nickel 200, nickel chromium alloy, nickel aluminum bronze, 70/30 copper nickel, lead, stainless steel grade 430, magnesium, zinc, beryllium, aluminum alloys, cadmium, mild steel, cast iron, low alloy steel, austenitic cast iron, aluminum bronze, naval brass, yellow brass, red brass, tin, copper, 50/50 lead tin solder, admiralty brass, aluminum brass, manganese bronze, silicon bronze, stainless steel grades 410, 416, nickel silver, or alloys containing those metals or a combination thereof. In some embodiments, first electrode 200 includes at least one of steel, aluminum, titanium, alloy 20 stainless steel, stainless steel 316 and 317 nickel copper, stainless steel grades 301, 304, 321 and 347, silver, nickel 200, nickel chromium alloy, nickel aluminum bronze, 70/30 copper nickel, lead, stainless steel grade 430, and alloys containing those metals. In some embodiments, second electrode 202 includes at least one of copper, carbon, graphite, graphene, carbon fiber, magnesium, zinc, beryllium, aluminum alloys, cadmium, mild steel/cast iron, low alloy steel, austenitic cast iron, aluminum bronze, naval brass, yellow brass, red brass, tin, copper, 50/50 lead tin solder, admiralty brass, aluminum brass, manganese bronze, silicon bronze, stainless steel grades 410, 416, nickel silver, or combinations thereof. Space 204, which defines a flow path, is an annular space between electrodes 200 and 204 and extends along the length of the electrode pairing. The shape and volume of flow path 204 depend on the respective shapes of the electrodes. In some embodiments, first electrode 200 and second electrode 202 are coaxial. In some embodiments, flow path 204 is generally annular. In some embodiments, second electrode 202 has an outer diameter of about 0.166 inches to about 0.5 inches. In some embodiments, first electrode 200 has a diameter of about 0.1 inches to about 0.166 inches.

First electrode 200 and second electrode 202 act as anode and cathode, respectively, for battery 102, which when connected via electrolyte solution 108 will result in a reduction-oxidation reaction and produce electric current. Separating electrolyte solution 108, i.e., by containing it in first fluid container 104, prevents the reduction-oxidation reaction from occurring until there is a demand for energy from battery 102, when valve 116 opens and allows the electrolyte solution to flow into the battery and connect electrodes 200 and 202. In this way, battery 102 is a deferred action energy source. Referring again to FIG. 2, in some embodiments, second electrode 202 is positioned so as to surround first electrode 200. Sufficient space is left to allow flow of electrolyte solution 108. First fluid container 104 is in fluid communication with flow path 204. Upon demand, electrolyte solution 108 is admitted to flow path 204 and the reduction-oxidation reaction proceeds.

Figure 3:
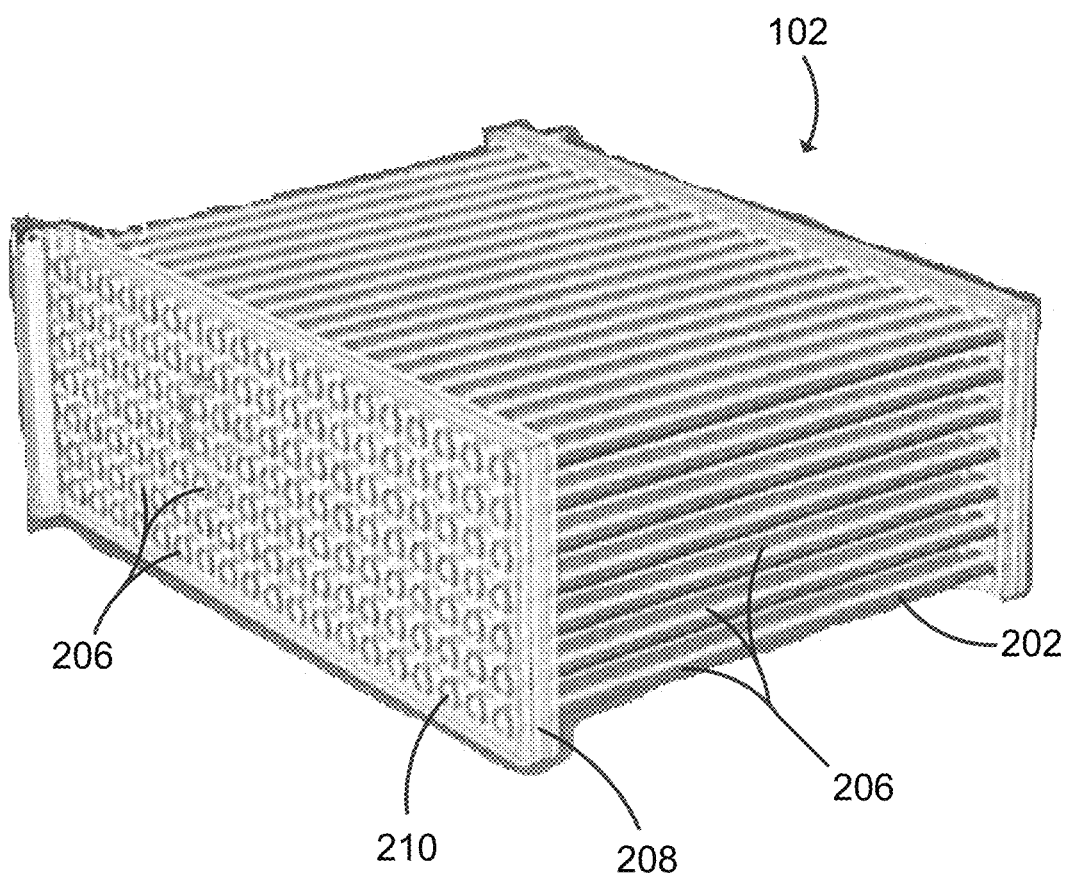
FIG. 3 is a schematic drawing of an array of galvanic cells according to some embodiments of the present disclosure.

Referring now to FIG. 3, in some embodiments, battery 102 includes an array 206 of first electrode 200 (not visible) and second electrode 202 pairs. In some embodiments, first electrode 200 and second electrode 202 pairs are wired in series. In some embodiments, battery 102 further includes an alignment endcap 208 holding pairs of first electrodes 200 and second electrodes 202 in array 206 substantially parallel to adjacent electrode pairs. In some embodiments, alignment endcap 208 includes electrical connections. In some embodiments, endcap 208 includes indentations or holes 210 to align first electrode 200 and second electrode 202. In some embodiments, control components (not shown), such as for providing power to pump 114 or modulating power sent to electric panel 122 are provided in endcap 208. In some embodiments, system 100 includes at least two arrays 206. In some embodiments with a plurality of arrays 206, the arrays are wired in parallel.

Figure 4:
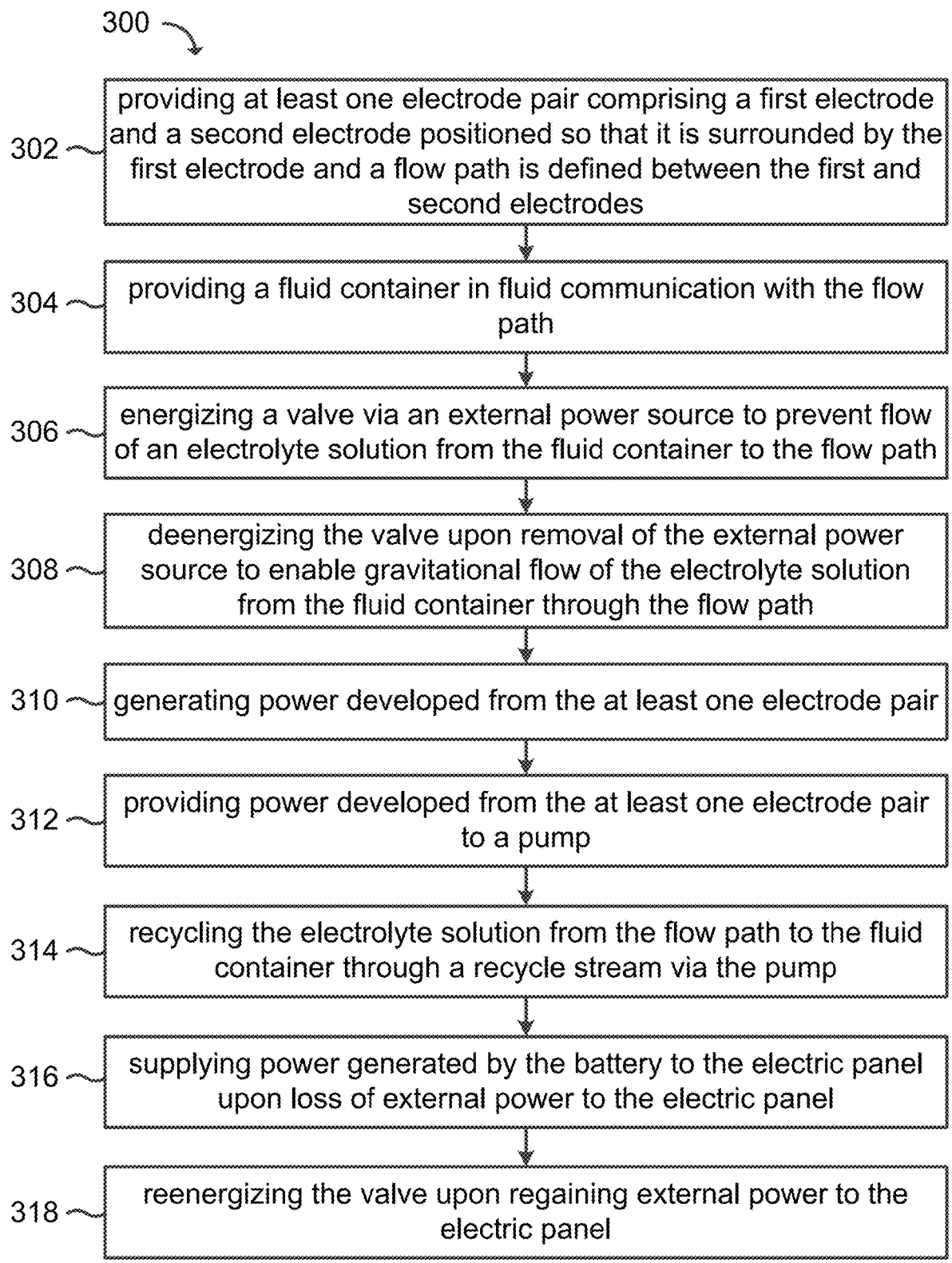
FIG. 4 is a flowchart of a method for providing backup power according to some embodiments of the present disclosure.

Referring now to FIG. 4, some embodiments of the disclosed subject matter include a method 300 for providing battery backup power. In some embodiments, at 302, a pair of electrodes is provided. As discussed above, in some embodiments, one (first) electrode is surrounded by a second electrode to define a flow path between those electrodes. In some embodiments, a single pair of electrodes is provided. In some embodiments, a plurality of electrode pairs are provided as an array. In some embodiments, the electrode pairs in the array are arranged substantially parallel to other pairs in the array. In some embodiments, a plurality of arrays are provided.

At 304, a fluid container in fluid communication with the flow path is provided. As discussed above, the fluid container includes an electrolyte solution. At 306, a valve is energized to prevent flow of the electrolyte solution from the fluid container to the flow path. At 308, the valve is deenergized and the electrolyte solution is allowed to flow from the fluid container to the flow path. As discussed above, in some embodiments, flow from the fluid container to the flow path is gravity-fed.

At 310, energy is generated from the flow of the electrolyte solution through the flow path. At 312, generated power is provided to a pump. At 314, the electrolyte solution is recycled to the fluid container.

In some embodiments, method 300 further includes steps 316 and 318. At 316, power is supplied to an electric panel when external power to the electric panel is removed. At 318, the valve is reenergized when external power is restored. In some embodiments, when external power is restored, battery 102 and any lower fluid containers, such as second container 106, are substantially drained of residual electrolyte solution before system 100 returns to a dormant state. In some embodiments, the residual electrolyte solution is recycled back to first fluid container 104.

The systems of the present disclosure advantageously provide efficient on-demand power. Fluid containers and connecting conduits are positioned at varying elevations for gravity-fed flow of electrolyte solutions through the system, where the flow results in a reduction-oxidation reaction and production of electric current. The systems are maintained in a dormant state by external energy sources preventing flow of the electrolyte solution. Removal of the external power supply itself allows electrolyte solution to proceed, thus activating a system implemented to compensate for an absent external power supply, i.e. deferred action. When the system is activated from a dormant state, the position of system components enables initial electrolyte solution flow and thus current generation via the potential energy stored in the electrolyte solution itself, resulting in near instantaneous energy generation without external intervention.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:
1. A method for providing battery backup power comprising:
providing an electrode pair including a first electrode and a second electrode positioned so as to surround said first electrode and a flow path is defined between said first and second electrodes;

providing a fluid container in fluid communication with said flow path;
energizing a valve via an external power source to prevent flow of an electrolyte solution from said fluid container to said flow path;
deenergizing said valve upon removal of said external power source to enable gravitational flow of said electrolyte solution from said fluid container through said flow path;
generating power developed from said electrode pair;
providing power developed from said electrode pair to a pump; and
recycling said electrolyte solution from said flow path to said fluid container through a recycle stream via said pump;
wherein said electrode pair includes an array of electrode pairs substantially parallel to adjacent electrode pairs.

2. The method according to claim 1, further comprising automatically supplying power generated by said battery to an electric panel upon loss of external power to said electric panel.

3. The method according to claim 2, further comprising automatically reenergizing said valve upon regaining external power to said electric panel.

4. The method according to claim 1, further comprising one or more additional arrays of first and second electrode pairs, said arrays wired in parallel.

5. A battery system for providing backup power, comprising:
a first electrode;
a second electrode positioned so as to surround said first electrode and a flow path is defined between said first and second electrodes;
a fluid container for containing electrolyte solution, said fluid container in fluid communication with said flow path;
a pump powered via said battery system, said pump in fluid communication with said fluid container and said flow path to recycle electrolyte solution from said flow path back to said fluid container;
a valve powered via an external power source positioned so as to reversibly prevent fluid flow from said fluid container to said flow path, and
an array of first and second electrode pairs.

6. The battery system according to claim 5, wherein electrolyte solution flow from said fluid container to said first and second electrodes is at least gravity fed.

7. The battery system according to claim 5, wherein said first electrode and said second electrode include at least one of steel, aluminum, magnesium, zinc, gold, platinum, copper, carbon, graphite, graphene, and carbon fiber.

8. The battery system according to claim 7, wherein said first electrode includes at least one of steel and aluminum and said second electrode includes at least one of copper, carbon, graphite, graphene, and carbon fiber.

9. The battery system according to claim 5, further comprising an alignment endcap holding pairs of first and second electrodes in said array substantially parallel to adjacent pairs of first and second electrodes.

10. The battery system according to claim 5, wherein said first and second electrode pairs are wired in series.

11. The battery system according to claim 5, further comprising one or more additional arrays of first and second electrode pairs, wherein said arrays of first and second electrode pairs are wired in parallel.

12. The battery system according to claim 5, further comprising a second fluid container in fluid communication with said flow path and said fluid container.

13. The battery system according to claim 9, wherein said alignment endcap includes an electrical connection.

14. The battery system according to claim 13, further comprising an inverter for converting DC current to AC current, wherein at least a portion of said AC current is supplied to said pump.

15. The battery system according to claim 5, wherein said electrolyte solution includes an aqueous salt.

16. The battery system according to claim 5, further comprising a transfer switch for automatically supplying power generated by said battery system to an electric panel upon loss of external power to said electric panel.

17. A battery system for providing backup power, comprising:
a first fluid container including an electrolyte solution;
a second fluid container in fluid communication with said first fluid container via a recycle stream;
an array of electrode pairs positioned at a lower elevation relative to said first fluid container, said electrode pairs including a central first electrode rod and a surrounding coaxial second electrode defining an array of annular flow paths along a length of said electrode pairs, said electrode pairs wired in series, wherein said array of annular flow paths is in fluid communication with first fluid container and second fluid container;
a valve energized by an external power source, said valve positioned so as to prevent electrolyte solution flow from said first fluid container to said array of annular flow paths when energized, and to allow gravity-fed electrolyte solution flow from said first fluid container through said array of annular flow paths upon removal of said external power source;
a pump powered by said battery system, said pump in fluid communication with said first fluid container and said second fluid container; and
a transfer switch for automatically supplying power generated by said battery system to an electric panel upon loss of external power to said electric panel.

18. A battery system according to claim 17, further comprising one or more additional arrays of electrode pairs, wherein said arrays are wired in parallel.

* * * * *